US010187180B2

(12) United States Patent
Sorrentino et al.

(10) Patent No.: US 10,187,180 B2
(45) Date of Patent: Jan. 22, 2019

(54) FLEXIBLE TRANSMISSION MODE AND REPORT FORMAT SELECTION FOR D2D

(71) Applicant: Telefonaktiebolaget LM Ericsson (publ), Stockholm (SE)

(72) Inventors: Stefano Sorrentino, Solna (SE); Qianxi Lu, Beijing (CN); Xinghua Song, Beijing (CN); Shaohua Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/527,302

(22) PCT Filed: Dec. 2, 2015

(86) PCT No.: PCT/SE2015/051299
§ 371 (c)(1),
(2) Date: May 16, 2017

(87) PCT Pub. No.: WO2016/089293
PCT Pub. Date: Jun. 9, 2016

(65) Prior Publication Data
US 2017/0331593 A1    Nov. 16, 2017

(30) Foreign Application Priority Data

Dec. 2, 2014  (WO) ................ PCT/CN2014/092846

(51) Int. Cl.
| *H04L 1/00* | (2006.01) |
| *H04L 1/18* | (2006.01) |
| *H04W 24/10* | (2009.01) |
| *H04W 92/18* | (2009.01) |

(52) U.S. Cl.
CPC .......... *H04L 1/0073* (2013.01); *H04L 1/0026* (2013.01); *H04L 1/0031* (2013.01); *H04L 1/18* (2013.01); *H04L 1/1854* (2013.01); *H04L 2001/0092* (2013.01); *H04W 24/10* (2013.01); *H04W 92/18* (2013.01)

(58) Field of Classification Search
CPC ..... H04W 92/18; H04W 24/10; H04W 76/14; H04W 92/14; H04W 92/10; H04L 1/00; H04L 1/18
See application file for complete search history.

(56) References Cited

U.S. PATENT DOCUMENTS

| 2011/0267975 | A1 | 11/2011 | Tanaka et al. |
| 2014/0241262 | A1 | 8/2014 | Novak et al. |
| 2014/0269338 | A1* | 9/2014 | Jung ............... H04L 5/0055 370/241 |
| 2015/0078279 | A1* | 3/2015 | Ko et al. ............ H04W 76/14 370/329 |
| 2017/0048861 | A1* | 2/2017 | Choi ................ H04L 5/0055 |

OTHER PUBLICATIONS

International Search Report and Written Opinion for International Patent Application No. PCT/SE2015/051299, dated Feb. 25, 2016, 8 pages.

* cited by examiner

*Primary Examiner* — Mewale A Ambaye
(74) *Attorney, Agent, or Firm* — Sage Patent Group

(57) ABSTRACT

There is disclosed a method for operating a wireless device, the wireless device being Device-to-Device (D2D) enabled. The method comprises determining feedback on one or more than one communication channel comprising at least one channel of D2D communication and sending different reports on the feedback to different targets.

4 Claims, 8 Drawing Sheets

US 10,187,180 B2

FLEXIBLE TRANSMISSION MODE AND REPORT FORMAT SELECTION FOR D2D

This application is a 35 U.S.C. § 371 national phase filing of International Application No. PCT/SE2015/051299, filed Dec. 2, 2015, which claims the benefit of International Application No. PCT/CN2014/092846, filed Dec. 2, 2014, the disclosures of which are incorporated herein by reference in their entireties.

TECHNICAL FIELD

The present disclosure pertains to wireless communication technology, in particular to D2D communication related to a wireless communication network.

BACKGROUND

Local IP based services may be accessed in the home, office, public hot spot or even outdoor environments. One of the important use cases for the local IP access and local connectivity involves the direct communication between devices in the close proximity (typically less than a few 10 s of meters, but sometimes up to a few hundred meters) of each other.

This direct mode or device-to-device (i.e. D2D) enables a number of potential gains over the traditional cellular technique, because D2D devices may be much closer to one another than cellular devices that have to communicate via cellular access point (e.g., eNB):

Capacity gain: First, radio resources (e.g. OFDM resource blocks) between the D2D and cellular layers may be reused (reuse gain). Second, a D2D link uses a single hop between the transmitter and receiver points as opposed to the 2-hop link via a cellular AP (hop gain).
  Peak rate gain: due to the proximity and potentially favorable propagation conditions high peak rates could be achieved (proximity gain);
  Latency gain: When the UEs communicate over a direct link, eNB forwarding is short cut and the end-to-end latency can decrease.

D2D communication or operation may also be called direct link or direct mode communication or operation or peer-to-peer communication or operation or sidelink communication or operation or ProSe (proximity services) communication or operation.

A wireless connection for D2D operation or communication may be called sidelink, it may refer to a direct communication link and/or radio link between two wireless devices or UEs (user equipment). D2D communication and/or such a link may generally be provided via unicast, multicast and/or broadcast.

Recently, device-to-device (D2D) communications as an underlay to cellular networks have been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource and (dynamic) sharing between the device-to-device services and cellular services is more flexible and provides higher spectrum efficiency.

D2D applications include direct discovery and direct communication. In both cases, the transmitter sends D2D signals that should be directly received at least by the intended receivers.

D2D should also be able to operate in multi-carrier scenarios where cellular and/or D2D is configured to operate on multiple carriers. Such carriers do not necessarily belong to a single operator and are not necessarily coordinated and synchronized.

SUMMARY

The present disclosure pertains to approaches of improving the quality of D2D communication without unduly increasing the amount of signaling overhead.

Accordingly, a method for operating a wireless device is proposed, the wireless device being D2D enabled. The method comprises determining feedback on one or more than one communication channel comprising at least one channel of D2D communication, and sending different reports on the feedback to different targets.

Also, a wireless device for a wireless communication network is described. The wireless device is D2D enabled, and adapted for determining feedback on one or more than one communication channel comprising at least one channel of D2D communication. The wireless device is further adapted for sending different reports on the feedback to different targets.

A method for operating a network node in a wireless communication network may be considered as well. The method comprises configuring a D2D enabled wireless device for sending different reports on feedback on one or more than one communication channel comprising at least one channel of D2D communication to different targets.

Moreover, a network node for a wireless communication network is envisioned. The network node is adapted for configuring a D2D enabled wireless device for sending different reports on feedback on one or more than one communication channel comprising at least one channel of D2D communication to different targets.

A program product comprising code executable by control circuitry may be contemplated. The code causes the control circuitry to perform and/or control any of the methods described herein.

In addition, there is proposed a carrier medium arrangement carrying a program product as described herein and/or code executable by control circuitry, the code causing the control circuitry to perform and/or control any of the methods described herein.

With the proposed approaches, feedback reports may be selectively transmitted to different targets, allowing higher flexibility for the reporting and to lower the signaling overhead in particular in comparison with sending the same reports to all possible targets (which usually means that the reports will have to include a maximum of information, as all information required by any of the targets will have to be included). According to the presented approaches, feedback reports are made available at the targets, which may use these reports for improving the quality of communication, e.g. by implementing link adaptation and/or power control based on the feedback, and/or performing HARQ processes.

BRIEF DESCRIPTION OF THE DRAWINGS

The drawings are provided for illustrative purposes and are not intended to limit the scope of this disclosure. In the figures of the drawings.

DETAILED DESCRIPTION

Figure 1:
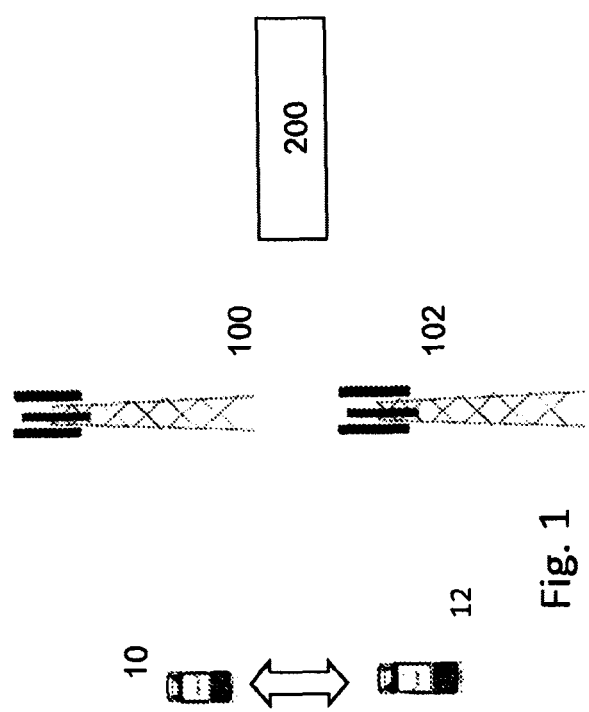
FIG. 1 shows an exemplary first communication link setup.

In LTE, different TMs (transmission mode) are defined (e.g. for cellular communication), where the TMs are associated to a set of TSs and RMs (reporting mode). Furthermore, each TM is associated to a set of supported DCI formats for UL/DL scheduling. In LTE all reporting from the UE is towards the serving eNB via cellular control channels. In the following, examples may be specifically refer to LTE or LTE-based systems. However, the approaches presented are not limited to LTE, but may be implemented in other D2D communication systems as well, in particular systems also allowing cellular communication.

In LTE Rel-12, two TMs for D2D are defined, TM-1 and TM-2. Neither of them is provided with a feedback channel or RM (reporting mode), and only TM-1 requires resource grants from the eNB via a D2D DCI (Downlink Control Information) format.

For the evolution of D2D it is suggested to introduce feedback from the receiver (e.g. a Rx UE) towards the transmitter to enable adaptive transmission parameters (e.g., link adaptation).

Splitting the feedback into parallel feedback channels targeting different nodes may be considered, in particular in a flexible way such that only information relevant for a certain node is delivered. Thus, even with the RRM split among different nodes (UEs and eNBs), it may be avoided to convey feedback information to all such nodes, which would incur excessive feedback overhead and associated power consumption in the UEs.

A feedback may generally pertain to measurements (e.g. on received signals, and/or for CSI or CQI) performed by and/or reception conditions on or determined by a receiving wireless device or UE, e.g. a Rx UE. Feedback may comprise corresponding information to be transmitted to one or more UEs and/or on or more network nodes and/or eNBs. It may be considered that feedback comprises a report pertaining to the corresponding information. Feedback may be implemented as and/or comprise and/or be represented by a report, which may be a feedback report or measurement report. Feedback may in particular comprise and/or pertain to ARQ or HARQ information (e.g. ACK/NACK signaling) and/or channel state information or channel quality information (CSI/CQI), e.g. based on reception of packets (respectively the determination of whether a packet, which may be represented by a transport block) and/or on measurements, respectively. Measurement may in particular be performed on pilot or reference signals, e.g. CRS signals or similar.

Feedback may be transmitted, by the Rx UE, on a channel. Feedback to different entities like UEs and/or eNBs may be transmitted on different channels, which may be called feedback channels. A feedback channel may be or comprise a physical and/or logical and/or transport channel, in particular a physical channel. A feedback channel may be associated to and/or be an uplink (or in the direction of the (transmission) target) part of a channel the feedback, in particular measurement feedback, pertains to. For example, it may be considered that measurements are performed when receiving on one channel, and the corresponding feedback is transmitted on the same channel. However, it may also be considered that feedback is transmitted or send on another channel; in particular, if the channel the feedback pertains to is not shared by the target and/or is only unidirectional, like an explicit downlink channel.

Parallel feedback channels may have different transmission rate and periodicity, depending on their content. Corresponding measurements may be performed by the UE with a corresponding rate and/or periodicity. The UE may be configured for such transmissions and/or measurements and/or feedback channels e.g. by a network or network node; for feedback on a direct link and/or feedback to another UE, the UE may be configured for such transmissions and measurements by the other UE.

Additionally, the feedback split can be a function of the coverage state, RRC (Radio Resource Control) state (e.g., connected or idle), release and/or capability of the transmitter and/or receiver.

This allows optimization of the energy consumption and overhead for D2D transmission with feedback from the receiver/receiving UE. Moreover, the general framework enables a flexible tradeoff between efficiency and complexity.

It is described that receivers send complete reports of all supported measurements to both the NW infrastructure (eNB) and the transmitter UE(s). This may in some cases be less desirable due to high of signaling overhead and energy consumption.

Another solution comprises of defining a set of supported RM to eNB and a set of RM to tx UE for each TM. The supported sets may be different for different TMs. There may be configured (e.g. on a Rx UE) parallel feedback channels towards one or more UEs and one or more network nodes or eNBs. The contents, periodicities, transmission resources and parameters for the parallel feedback channels may be different, e.g. configured differently by different or the same entities, e.g. eNBs or UEs.

For at least one TM it is possible to configure different content for the reporting towards the eNB(s) and the UE(s).

The Rx UE may be adapted to send, and/or send, and/or comprise a sending module to send, to each node (UE/eNB) at least the report comprising information required for RRM decisions at that node.

The reports towards different nodes may happen with different periodicities (if any) and at different times.

The reports towards the NW may be transmitted towards a different node (e.g., the tx UE) that will forward such reports towards the NW.

The reports may be obtained, e.g., from measurements at the rx UE based on signals transmitted by the tx UE and/or eNB, or any other measurement or information present in the UE.

The NW forwards D2D reports received at a certain eNB towards the node(s) performing RRM for the associated transmission UE(s) (e.g., the eNB serving the tx UE).

The format and/or content of the grants (or any RRM control message from the eNB) to the tx UE may be a function of the selected TM and/or the associated RM(s), as the level of RRM by the eNB may be different for different TMs. The wireless device or UE generally may be configured with or for a TM and/or RM, e.g. by the network, in particular a network node like a base station or eNodeB.

The set of supported TMs and/or RMs may be a function of the coverage state of the tx and/or rx.

The set of supported TMs and/or RMs may be a function of the RRC state of the tx and/or rx. E.g., UEs that are out of NW coverage are not able to report to an eNB.

Certain reports to the NW may be subject to and/or dependent on conditions of the cell associated to the transmitter UE and receiver UE. E.g., the selected TM/RM may be different whether or dependent on both tx and rx UEs belong to the same cell or not. Similar considerations hold when considering the PLMN ID associated to the tx and/or rx nodes. E.g., certain TM and/or RM may be supported only when both tx and rx are associated or are registered to the same PLMN.

The set of supported TMs/RMs is different depending on the release and capabilities of the tx and/or rx UE.

TABLE 1

Example list of transmission modes. For each TM a set of RMs is supported.

| Release | Tx Mode | Grant contents list (not exhaustive) | RRM-related functions in the UE (tx) | Supported RM(s) □ tx UE | Supported RM(s) □ eNB | Tx scheme |
|---|---|---|---|---|---|---|
| R12 | 1 | Resources (TTI level) Tx format OL + CL PC | None (follow eNB allocation) | A | C | R12 single antenna |
| R12 | 2 | Resources (Pool level) OL PC parameters | Resources (TTI level within the pools) | A | C | R12 single antenna |
| R13 | 3a (similar to R12 mode-1 + NW feedback) | Resources (TTI level) Tx format A/N OL + CL PC | None (follow eNB allocation) | A | D1, D2, D3 | R12 single antenna, R13 MIMO |
| R13 | 3b | Resources (TTI level) Tx format OL + CL PC | HARQ | B1, B2, B3 | D1, D2, D3 | R12 single antenna, R13 MIMO |
| R13 | 3c | Resources (TTI level) Tx format OL PC parameters | HARQ PC | B1, B2, B3 | D1, D2, D3 | R12 single antenna, R13 MIMO |
| R13 | 3d | Resources (TTI level) OL PC parameters | HARQ PC LA | B1, B2, B3 | D1, D2, D3 | R12 single antenna, R13 MIMO |
| R13 | 4 (similar to R12 mode-2 + UE-UE feedback) | Resources (Pool level) OL PC parameters | HARQ PC LA Resources (TTI level within the pools) | B1, B2, B3 | C | R12 single antenna, R13 MIMO |

TABLE 2

Example list of RMs from UE to UE.

| Release | Reporting Mode | Report content from the rx UE to tx UE |
|---|---|---|
| R12 (implicitly supported) | A | None (no feedback) |
| R13 | B1 | Feedback to the tx: A/N. |
| R13 | B2 | Feedback to the tx: A/N, CQI/CSI. |
| R13 | B3 | Feedback to the tx: A/N, CQI/CSI, info on interference. |

TABLE 3

Example list of RMs from UE to eNB.

| Release | Reporting Mode | FB from the rx UE to eNB* |
|---|---|---|
| R12 (implicitly supported) | C | None (no feedback |
| R13 | D1 | Feedback to the NW: A/N. |
| R13 | D2 | Feedback to the NW: A/N, CQI/CSI. |
| R13 | D3 | Feedback to the NW: A/N, CQI/CSI, info on interference. |

*FB to the NW can either be sent directly to the NW (tx or rx eNB) or routed via another UE (e.g., the tx UE)

Figure 7:
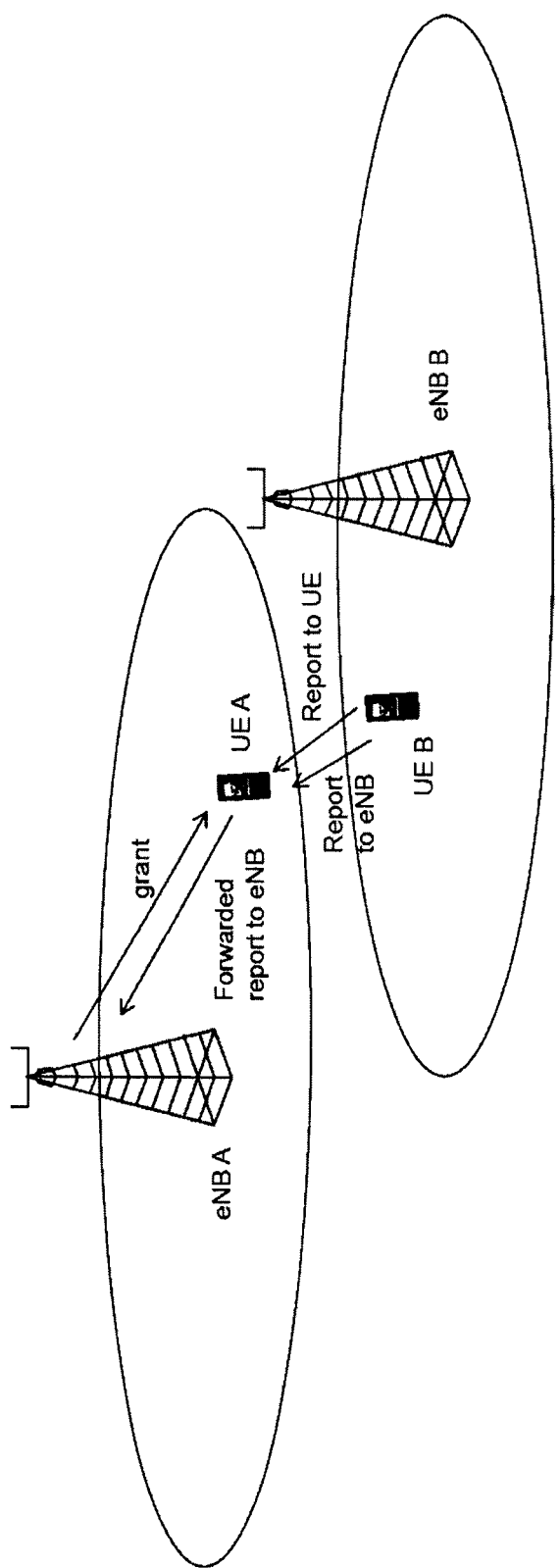
FIG. 7 shows an example of feedback forwarding.

FIG. 7 shows an example of forwarding of feedback from a UE towards the NW (eNB). The content of the feedback from UE B may be a subset or a function (e.g., subsampled or combined version) of the original content of the feedback from UE B to UE A.

Figure 8:
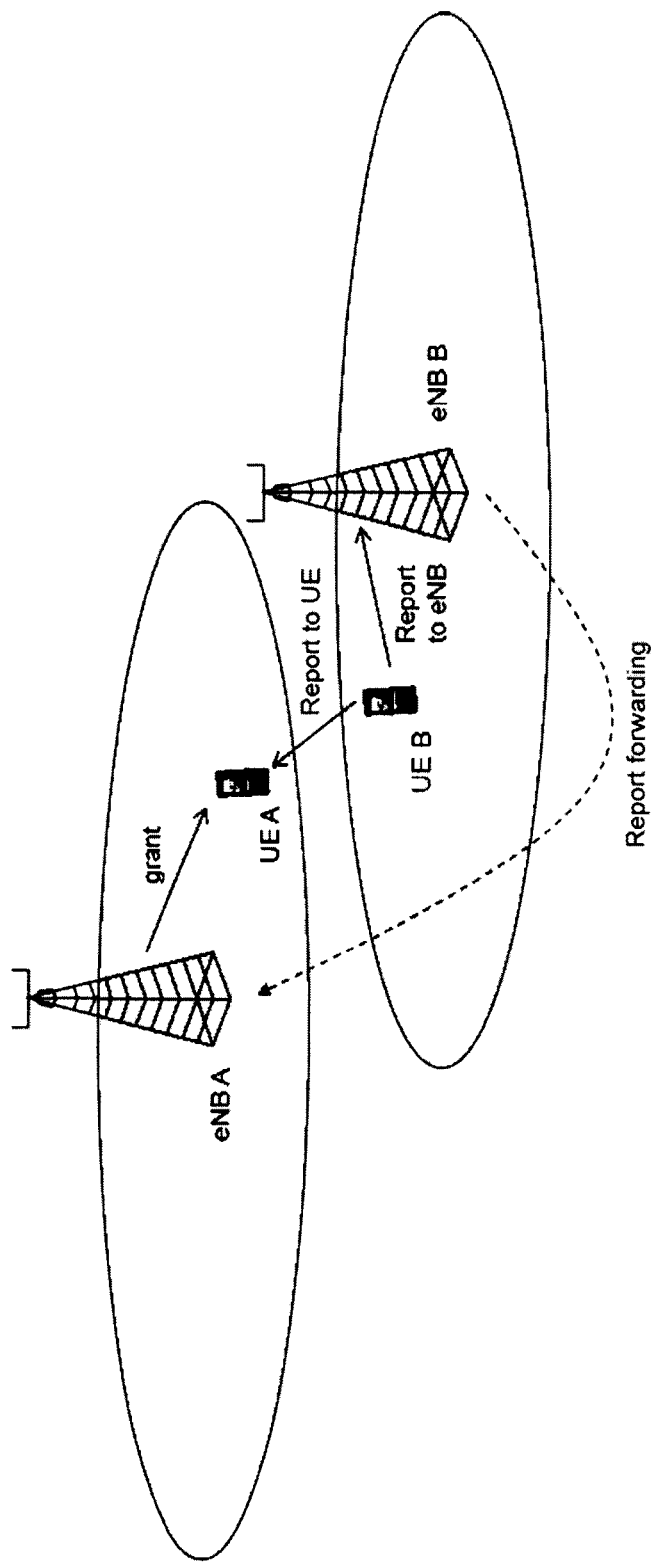
FIG. 8 shows an example of a split feedback channel.

FIG. 8 shows an example of split feedback channel. Part of the report is optionally forwarded to the node performing RRM over the NW infrastructure.

There is suggested splitting the control plane for D2D operation into different physical channels, where some of such channels and information target the NW infrastructure while other such channels target other UE devices.

There is disclosed a method for operating a wireless device or UE (Rx UE). The method may comprise determining feedback (e.g. by a feedback determining module), by the UE (Rx UE), on one or more than one communication channel or link, which may comprise at least one channel or link of D2D communication with another UE. The wireless device or UE may comprise a corresponding feedback determining module.

The method may further comprise sending, by the wireless device or UE, different reports on the feedback to different targets. The wireless device or UE may comprise a corresponding sending module. A report may be considered to be different from another if it contains different information and/or pertains to different channels (on which feedback has been determined). Determining feedback may generally be based on a configuration of the wireless device or UE, which may be configured or configurable, e.g. by the network, in particular a network node. The method may comprise receiving, e.g. by the wireless device or UE or a receiving module thereof, configuration or allocation data and/or a configuration. The configuration or corresponding configuration or allocation data may indicate a transmission mode (TM) and/or report mode (RM), based on which determining the feedback and/or sending report/s may be based. Determining feedback on a channel or link may comprise measurement performed on that channel and/or determining signal quality and/or SINR and/or quality of reception on this channel and/or providing a report on such feedback, e.g. by encoding corresponding information. The channel or link may be operated on a pre-determined transmission mode, e.g. based on a configuration of the UE. The Rx UE may be configured for such feedback and/or report on feedback, e.g. by a network or network node or another UE. A report on feedback may comprise information pertaining to the determined feedback on one or more than one channels, in particular on a channel the report is being send on. Determining feedback may alternatively or additionally comprise determining a ARQ/HARQ response, e.g. based on received signaling and/or a received transport block in a HARQ process.

A target may generally be a UE or eNB the Rx UE may communicate with and/or is adapted to communicate with. A report may be send via cellular or D2D communication. In particular, it may be considered that a report to a UE (with a UE as target) is sent via D2D communication. A report with a eNB as target may be send via cellular communication. A report may indicate parts of the determined feedback, e.g. according to the configuration.

There is generally disclosed a method for operating a wireless device or user equipment (UE), which may be a D2D or ProSe-enabled. There is also disclosed a wireless device or user equipment adapted to carry out any method for operating a wireless device or user equipment described herein. The wireless device or user equipment may generally comprise suitable modules to carry out steps of the method. There may be considered a method for carrying out any step or any combination of steps for operating a Tx UE and/or a correspondingly adapted wireless device, which may have one or more modules, each module adapted for performing a step of the method. There may be considered a method for carrying out any step or any combination of steps for operating a Rx UE and/or a correspondingly adapted wireless device, which may have one or more modules, each module adapted for performing a step of the method. There may be considered a method for carrying out any step or any combination of steps for operating a network node and/or a correspondingly adapted network node, which may have one or more modules, each module adapted for performing a step of the method.

Moreover, there is disclosed a method for operating a network node (in particular an eNodeB), which may be a controlling node. There is also a disclosed network node, in particular an eNodeB and/or controlling node, adapted to carry out any method for operating network node or eNodeB described herein. The network node may generally comprise suitable modules to carry out steps of the method. Generally, a method for operating a network node may comprise configuring, in particular configuring a UE or wireless device for determining and/or sending feedback as described herein, and/or configuring the wireless device or UE with a (corresponding) configuration. The network node may be adapted accordingly, and/or comprise a configuring module for such configuring. A configuration may be represented by configuration and/or allocation data, and/or may indicate a transmission mode (TM) and/or report mode (RM), based on which determining the feedback and/or sending report/s may be based. The method may comprise, and/or the network node and/or configuring module may be adapted for, determining the configuration, e.g. based on operational conditions, e.g. traffic load and/or signal or channel quality of one or more channels and/or quality of service requirements.

A program product comprising code executable by control circuitry is described, the code causing the control circuitry to perform and/or control any one method disclosed herein, in particular a method for operating a UE or a network node, in particular if running on control circuitry of the UE or the network node.

There is also disclosed a carrier medium arrangement carrying a program product according as described herein and/or code executable by control circuitry, the code causing the control circuitry to perform and/or control any one method disclosed herein. A carrier medium arrangement may comprise at least one carrier medium. The program product may be distributed over more than one carriers, so that e.g. different parts of the program product are stored or carried on different media.

There may generally be considered a wireless device adapted for carrying out any of the methods for operating a wireless device described herein. A network node adapted for carrying out any of the methods for operating a network node described herein may be envisaged.

A communication channel or channel may in particular be a physical channel, which may be a transmission channel in particular for data and control information. Feedback or a corresponding report may be seen as representing or comprising control information. A physical channel may comprise and/or be defined by a set of resource elements (representing time/frequency resources), which may be defined or set up and/or configured by the wireless communication network, in particular a network node or base station like an eNodeB.

A network node may be implemented as an eNodeB, in particular according to LTE. The network node may be adapted for, and/or comprise a receiving module for, receiving a report from a wireless device, and/or to relay the report to higher layers of the network and/or an operator billing service.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In this specification, UE or user equipment may be used as an example for or interchangeably with wireless device. eNode or base station may be used as an example for or interchangeably with network node.

Device-to-device (D2D). In some examples, the terms 'D2D' and 'proximity service' (ProSe) and even 'peer-to-peer communication' may be used interchangeably. A wireless device being D2D enabled or D2D UE or D2D device may be a wireless device enabled for D2D and may interchangeably be called UE or D2D-capable UE. An entity like a wireless device or UE that is D2D enabled may comprise any entity capable of at least receiving or transmitting radio signals on a direct radio link, e.g., between this entity and another D2D capable entity. A wireless device or D2D device may also be and/or be comprised in a cellular UE, PDA, a wireless device, laptop, mobile, sensor, relay, D2D relay, or even a small base station employing a UE-like interface, etc. A D2D device is able to support at least one D2D operation.

D2D operation may comprise any action or activity related to D2D, e.g., transmitting or receiving a signal/channel type for D2D purpose, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service.

Cellular operation and wireless access network (WAN) operation may be used interchangeably herein.

A D2D receive operation (e.g., receiving any signal or channel, with or without decoding, sensing on carrier frequency or specific resources or for a specific channel/signal, etc.) may be comprised in a D2D operation which may, in one example, also involve other than D2D receive operations.

Cellular operation (by UE) may comprise any action or activity related to cellular network (any one or more RATs), e.g. comprising one or more base station and a connected core network. Some examples of cellular operation may be a radio signal transmission, a radio signal reception, performing a radio measurement, performing a mobility operation or RRM related to cellular network.

Generally, a UE may be considered as an example or representative of a D2D device or a D2D enabled wireless device, and the term wireless device being D2D enabled or D2D enabled wireless device may be interchanged for UE unless explicitly stated otherwise.

An eNodeB or eNB or base station may be considered to be one variant of a network node, in particular a controlling node.

Figure 2:
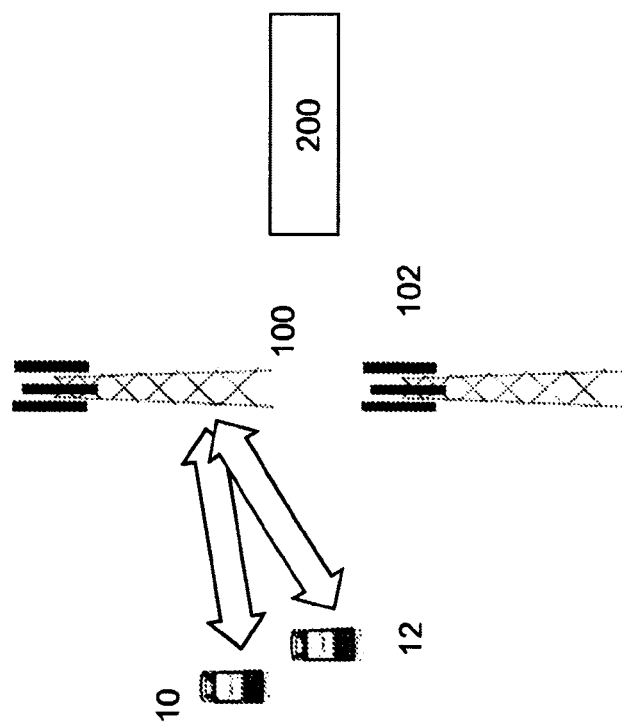
FIG. 2 shows an exemplary second communication link setup.
Figure 3:
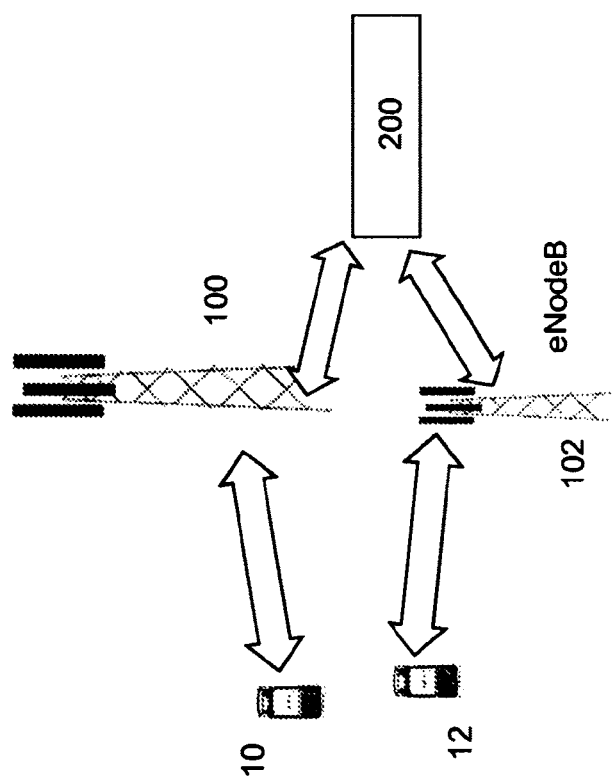
FIG. 3 shows an exemplary third communication link setup.

In FIGS. 1 to 3, there are shown different setups for communication of user equipments (as examples for D2D devices) within a mobile communication network. In these figures, the first node or first user equipment UE1 is indicated with reference numeral 10, the second node or second user equipment is indicated with reference numeral 12. A first base station or network node, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating or controlling nodes for D2D communication between the UEs 10, 12. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 10, 12 are in proximity to each other, they may be able to use a "direct mode" (e.g., as in FIG. 1) or "locally-routed" (e.g., as in FIG. 2) or assisted path for data communication as forms of D2D or direct or direct link communication, unlike in the conventional cellular communication (FIG. 3).

Figure 4:
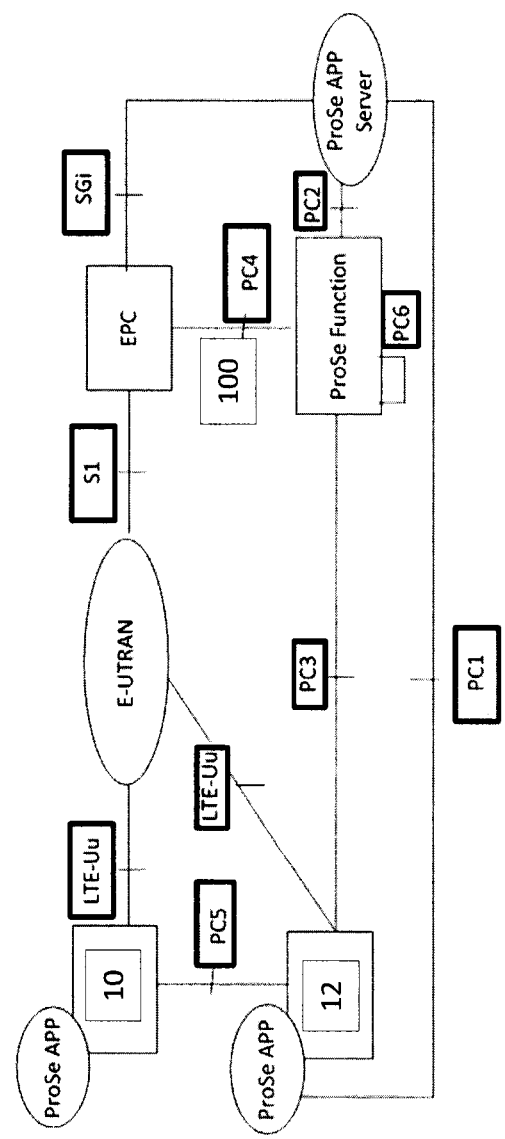
FIG. 4 shows an exemplary general D2D architecture.

A more detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on an D2D device or UE 10 or 12, PC2 a reference point between an ProSe Application server and a ProSe function provider on a server or base station side. PC3 indicates a reference point between the D2D device or UE 12 and the ProSE function, e.g. for discovery and/or communication. PC4 refers to a reference point between the EPC and the ProSe function, e.g. for setting up setting up one-to-one communication between UEs 10 and 12. PC5 is a reference point between D2D device or UE 10 and D2D device or UE 12, e.g. a first node and a second node involved in D2D communication, which may be used e.g. for direct or relayed communication between the UEs. PC6 identifies a reference point between ProSE functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
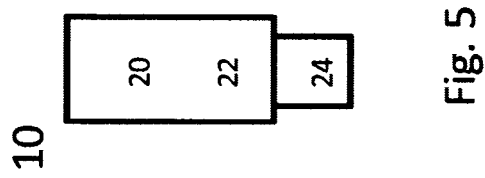
FIG. 5 shows an exemplary D2D-enabled wireless device.

FIG. 5 schematically shows a D2D device or user equipment 10, which may be a node of or for a device-to-device communication, in closer details. User equipment 10 comprises control circuitry 20, which may comprise a controller connected to a memory. A receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
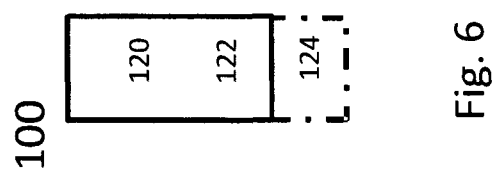
FIG. 6 shows an exemplary network node.

FIG. 6 schematically show a network node or base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

D2D transmission may be any transmission by a D2D device in D2D operation. Some examples of D2D transmission comprise or are related to physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link is intended for receiving by another D2D device. A D2D transmission may be a unicast, groupcast, or broadcast transmission. A D2D transmission may be on the uplink time-frequency resources of a wireless communication system.

A coordinating or controlling node may be a network node that schedules, decides, at least in part, or selects time-frequency resources to be used for at least one of: cellular transmissions and D2D transmissions. The coordinating node may also provide the scheduling information to another node such as another D2D device, a cluster head, a radio network node such as eNodeB, or a network node (e.g. a core network node, MME, positioning node, D2D server, RNC, SON, etc.). The coordinating node may communicate with a radio network node. The coordinating node may also perform coordination for one or more D2D devices or UEs. The coordination may be performed in a centralized or distributed manner.

Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT. RAT (radio access technology) may e.g. refer to LTE FDD, LTE TDD, GSM, CDMA, WCDMA, WiFi, WLAN, WiMAX, etc.

Generally, there may be considered a D2D device adapted to perform any one of the methods for operating a D2D device described herein. The D2D device may comprise suitable circuitry, e.g. control circuitry, e.g. for controlling a method, and/or transmitter/s and/or receiver/s and/or corresponding circuitry and/or antenna circuitry. There may be considered a network node adapted to perform any one of the methods for operating a network node described herein. The network node may comprise suitable circuitry, e.g. control circuitry, e.g. for controlling a method, and/or transmitter/s and/or receiver/s and/or corresponding circuitry and/or antenna circuitry Any of the D2D devices or UEs described herein (in particular, UE1 and UE2), may be a D2D device or UE for and/or of a wireless communication network, and/or adapted for cellular operation with a wireless communication network and/or for D2D operation.

Any of the network nodes (which in particular may be eNodeBs) described herein (in particular NW), may be a network node for and/or of a wireless communication network, and/or adapted for cellular operation with a wireless communication network, and/or at least one D2D device or UE, and/or for D2D operation and/or control of D2D operation, in particular with or of at least one D2D device or UE.

Additionally or alternatively, there may generally be considered a controlling node adapted to perform any one of the methods for operating a network node described herein.

A controlling node or network node may generally be implemented as base station or eNodeB.

According to a further aspect, there is provided a program product comprising code executable by control circuitry, the code causing the control circuitry to perform and/or control any one of the methods described herein.

Moreover, there is described, according to another aspect, a carrier medium carrying any one of the program products described herein and/or code executable by control circuitry, the code causing the control circuitry to perform and/or control any one of the methods as described herein.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A mobile communication network may generally comprise one or more than one network nodes, in particular a controlling node as described herein, and/or a radio access network (which may comprise the one or more than one network nodes) and/or a core network connected or connectable to the radio access network. The network and/or controlling node may be adapted to provide one or more cells for wireless and/or radio communication and/or to serve one or more D2D devices or UEs. A mobile communication network may be a cellular network. The controlling node may be adapted for controlling and/or serving and/or provide and/or support cellular communication and/or D2D communication.

Configuring a D2D device may involve instructing and/or causing the D2D device to change its configuration, e.g. at least one setting and/or register entry and/or operational mode. Configuring a D2D device for D2D measurement may refer to instructing and/or causing the D2D device to change operational parameters for D2D measurement, in particular according to a measurement performance characteristic. A D2D device may be adapted to configure itself. Configuring a D2D device by another device or node or network may refer to and/or comprise transmitting information and/or data and/or instructions to the D2D device by the other device or node or network, e.g. a D2D configuration and/or data regarding transmitter/s and/or receiver/s and/or data based upon which the configured or receiving D2D device may determine at least one transmitter and/or receiver to use, e.g. data indicating a preferred spectrum and/or frequency and/or carrier to be used. Configuring may involve changing one or more parameters and/or settings of the D2D device, in particular regarding transmitter/s and/or receiver/s.

Adapting a configuration may refer to configuring the D2D device, in particular by changing the configuration, e.g. by the D2D device.

Obtaining data may comprise receiving, e.g. from another node and/or device and/or the network, the data. Determining a transmitter and/or receiver for D2D operation may comprise selecting and/or configuring the transmitter and/or receiver for D2D operation. Configuring a radio resource like a transmitter or receiver may include adapting it for a desired operation, e.g. D2D operation, for example by tuning its operation parameters, e.g. frequency, bandwidth, power level, sensitivity, etc.

A D2D device may be considered to be connected or connectable for communication if it is able to communicate with another node or device or a network via wireless communication, in particular via D2D communication and/or cellular communication, e.g. if it is registered or may be registered in the network or with another D2D device, and/or is in such communication. Generally, a D2D device may be adapted for D2D operation and cellular operation, either in parallel or alternatively.

Receiving or transmitting, e.g. in the context of configuring the D2D device, may generally be performed via cellular communication and/or D2D communication, if the mode is not explicitly mentioned.

Some abbreviations used are:
3GPP 3$^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DCI Downlink Control Information/Indication
DL Downlink
EPDCCH Enhanced Physical DL Control CHannel
DL Downlink; generally referring to transmission of data to a node/into a direction further away from network core (physically and/or logically); in particular from a base station or eNodeB to a wireless device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
IMSI International Mobile Subscriber Identity
L1 Layer 1
L2 Layer 2
LTE Long Term Evolution, a telecommunications or wireless or mobile communication standard
MAC Medium Access Control
MBSFN Multiple Broadcast Single Frequency Network
MDT Minimisation of Drive Test
MIMO Multiple input, multiple output (use of multiple antennas)
MPC Measurement Performance Characteristic
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PLMN Public Land Mobile Network
ProSe Proximity Service/s, another name for D2D
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SIB System Information Block
SINR/SNR/SIR Signal-to-Noise-and-Interference Ratio; Signal-to-Noise Ratio<Signal-to-Interference Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UICC Universal Integrated Circuit Card; card used for mobile/cellular communication in a UE
UL Uplink; generally referring to transmission of data to a node/into a direction closer to a network core (physically and/or logically); in particular from a wireless device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency RRC Radio Resource Control
DRX Discontinuous Reception
PDCCH Physical Downlink Control CHannel
ProSe Proximity Service
IMSI International Mobile Subscriber Identity
CSI Channel State Information
CE Control Element
D2D device-to-device
NW network
SA Scheduling Assignment
ProSe Proximity-based Services
PA Power Amplifier
PC Power control
TF Transmission format
RRM radio resource management
RA Resource allocation
BSR Buffer status report
RRM Radio resource management
A/N Ack/Nack
TM Transmission mode
TS Transmission scheme
RM Reporting mode
PLMN Public Land mobile network
CL Closed loop (of power control), generally power control based on power control commands (e.g. TPC commands) received from an eNodeB; TPC commands may indicate a number of steps (in particular 0, 1 or −1) of a predetermined or configured size the transmit power is to be increased (or decresed, for negative values of TPC)
OL Open loop (of power control): generally, power control such that a configured signal quality (e.g., in SIR/SNR/SINR) is achieved.
R12, R13 LTE release 12, 13

These and other abbreviations may be used according to LTE standard definitions.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a Wireless device and/or user equipment and/or base station and/or relay node and/or any device generally adapted for device-to-device communication. A wireless communication network may comprise at least one of a device configured for device-to-device communication, a wireless device, and/or a user equipment and/or base station and/or relay node, in particular at least one user equipment, which may be arranged for device-to-device communication with a second wireless device or node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A wireless device or user equipment (UE) may generally be a device configured for (wireless) device-to-device communication (it may be a wireless device) and/or a terminal for a wireless and/or cellular network, in particular a mobile terminal, for example a mobile phone, smart phone, tablet, PDA, etc. A user equipment may be a node of or for a wireless communication network as described herein, in particular a wireless device. It may be envisioned that a wireless device user equipment or wireless device is adapted for one or more RATs, in particular LTE/E-UTRA. A user equipment or wireless device may generally be proximity services (ProSe) enabled, which may mean it is D2D capable or enabled. It may be considered that a user equipment or wireless device comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or wireless device. It may be considered that a user equipment is configured to be a user equipment adapted for LTE/E-UTRAN.

A network node may be a base station, which may be any kind of base station of a wireless and/or cellular network adapted to serve one or more wireless device or user equipments. It may be considered that a base station is a node of a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

Device-to-device (D2D) communication or operation may generally refer to communication between nodes or wireless devices of or for a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or controlling node and/or with a base station or controlling node providing merely auxiliary services, e.g. configuration data or a transmission configuration or related information for a message intended for device-to-device communication between user equipments. D2D communication may be communication between two wireless devices in a region without cellular coverage and/or without interaction with a cellular or mobile network. In the latter case, it may be considered that data and/or signals flowing between the nodes performing device-to-device communication are not transported via a base station and/or controlling node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A device configured for and/or capable of device-to-device communication, which may be called wireless device or D2D enabled node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more wireless devices, in particular to a first wireless device. Accordingly, D2D resource allocation may be performed by the network and/or by a node, in particular a node within and/or within a cell of a cellular network covering the wireless devices participating or intending to participate in the D2D communication.

Allocation data may be considered to be data indicating and/or granting resources allocated by the controlling or allocation node, in particular data identifying or indicating which resources are reserved or allocated for D2D communication for a wireless device and/or which resources a wireless device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception, in particular regarding D2D operation. A scheduling assignment may be considered to represent scheduling data and/or be seen as an example of allocation data. A scheduling assignment may in particular refer to and/or indicate resources to be used (e.g. by the intended target UE or Rx UE) for D2D communication or operation, in particular for the reception of D2D transmission from another or source UE (e.g. Tx UE).

In the context of this description, a user equipment or wireless device generally may be a device capable of D2D communication and/or operation, in particular using frequencies and/or resources of a cellular and/or licensed communication system, e.g. a system according to a LTE standard, and may be also referred to as D2D enabled or capable UE or node. A wireless device may comprise any entity or equipment or device or node capable of at least receiving and/or transmitting radio signals on a direct radio link, i.e., between the entity and another D2D capable entity or wireless device. A wireless device or wireless device may for example be comprised in or comprise a cellular UE, PDA, a wireless device, laptop, mobile, sensor, relay, D2D relay, a small base station employing a UE-like interface, etc. Any device or entity capable to support and/or perform at least one D2D operation may be considered a wireless device; a wireless device may be adapted to support and/or perform at least one D2D operation. A wireless device may generally be adapted for cellular operation and/or communication in a wireless communication network. It may be considered that a wireless device generally comprises radio circuitry and/or control circuitry for wireless communication, in particular D2D operation or communication and cellular operation or communication. A wireless device may comprise a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably with D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

ProSe or D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a wireless device or UE. A D2D receive operation may comprise receiving, by a wireless device or UE, of D2D data and/or signals. A D2D transmit operation may comprise, transmitting, by a wireless device or UE, of D2D data and/or signals. A wireless device performing at least one ProSE/D2D operation may be considered to be in D2D or D2D mode or in D2D operation. D2D operation may comprise D2D measurements. A user equipment adapted to perform at least one type of ProSe/D2D operation may be considered to be ProSe/D2D-enabled.

A D2D measurement may be a measurement, e.g. performed by a wireless device, performed for D2D purpose and/or on D2D signals/channels and/or regarding D2D operation and/or communication. D2D measurement may comprise any one or any combination of: D2D RRM measurement, D2D positioning measurement, D2D synchronization measurement, measurement on D2D synchronization signals, measurement on D2D reference signals, measurement on D2D channel/s, signal-to-noise measurement, signal strength measurement, signal quality measurement, in particular measurement of received signal strength, of received signal quality, RLM, synchronization, one-directional and/or two-directional timing measurement, RTT or Rx-Tx or similar measurement, measurement of number of successful and/or unsuccessful channel decodings or receptions, data throughput measurements, measurement of amount of data transmitted and/or received, billing-relevant measurement; these measurement may be performed regarding D2D communication and/or D2D operation. Cellular operation (in particular by a wireless device or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission or communication may be any transmission or communication by a wireless device or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another wireless device. A D2D transmission may be a unicast, groupcast, or broadcast transmission. A D2D transmission may be on the uplink time-frequency resources of a wireless communication system.

A network node may be a controlling node connected or connectable to a UE for cellular and/or D2D communication. A controlling node may be defined by its functionality of configuring the UE device, in particular in regards to measuring and/or reporting data pertaining to D2D operation, and/or for defining and/or allocating and/or configuring one or more than one resource pools, in particular resource pools for ProSe operation and/or ProSe discovery. A controlling node may be a network node that is adapted to schedule, decide and/or select and/or allocate, at least in part, time-frequency resources to be used for at least one of: cellular communication or transmissions and D2D communication or transmissions.

The controlling node may also provide scheduling information to another node, such as another wireless device, a cluster head, a radio network node such as eNodeB, or a network node (e.g. a core network node), MME, positioning node, D2D server, RNC, SON, etc). The network node or controlling node may be or communicate with a radio network node. It may be envisioned that a controlling node may also perform coordination and/or control for one or more wireless device or UEs. The coordination and/or control may be performed in a centralized or distributed manner. A controlling node may be referred to as an allocating node and/or a coordinating node.

A network device or node and/or a wireless device may be or comprise a software/program arrangement arranged to be executable by a hardware device, e.g. control circuitry, and/or storable in a memory, which may provide D2D functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT. Cellular communication or operation may comprise data transmission from one wireless device or UE to another being routed via at least one network node and/or base station, instead of being directly transmitted from one wireless device to another like in D2D communication.

RAT (radio access technology) may generally include: e.g. LTE FDD, LTE TDD, GSM, CDMA, WCDMA, WiFi, WLAN, WiMAX, etc.

A network node may generally be a radio network node (which may be adapted for wireless or radio communication, e.g. with a wireless device or a UE) or another network node, e.g. an eNodeB. A network node generally may be a controlling or allocating node; an eNodeB defining and/or configuring one or more resource pools may be seen as controlling or allocating node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a wireless device or UE, if it provides a cell of a cellular network to the served node or wireless device or UE and/or is connected or connectable to the wireless device or UE via and/or for transmission and/or reception and/or UL and/or DL data exchange or transmission and/or if the network node is adapted to provide the wireless device or UE with allocation and/or configuration data and/or a measurement performance characteristic and/or to configure the wireless device or UE.

A wireless device may generally be a node or device adapted to perform D2D communication, in particular transmission and/or reception, and/or at least one type of D2D operations. In particular, a wireless device may be a terminal and/or user equipment and/or D2D enabled machine and/or sensor. The wireless device may be adapted to transmit and/or receive D2D data based on allocation data, in particular on and/or utilizing resources indicate in the allocation data. D2D communication and/or transmission by a wireless device may generally be in UL resources and/or corresponding carrier or frequency and/or modulation. A wireless device (such as a UE) may be adapted for and/or capable of CA or CA operation. In particular, it may be adapted to transmit and/or receive one or more than one CCs and/or utilising, and/or participating in, carrier aggregation. A wireless device may be adapted to configure itself and/or be configured according to configuration data, which may include setting up and/or scheduling resources and/or equipment for receiving and/or transmitting and/or sharing of resources and/or in particular D2D operation and/or cellular operation based on the configuration data. Configuration data may be received, by the wireless device, from another node or wireless device, in particular a network node.

A network node may generally be adapted to provide and/or determine and/or transmit configuration data, in particular to a wireless device. Configuration data may be considered to be a form of allocation data and/or may be provided in the form of a message and/or data packet/s. Configuring a wireless device or UE, e.g. configuring of the node by a network node, may include determining and/or transmitting configuration data to the node to be configured, i.e. the wireless device or UE. Determining the configuration data and transmitting this data to a wireless device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Cellular DL operation and/or communication of a wireless device or UE may refer to receiving transmissions in DL, in particular in cellular operation and/or from a network node/eNB/base station. Cellular UL operation of a wireless device or UE may refer to UL transmissions, in particular in cellular operation, e.g. transmitting to a network or network node/eNB/base station.

Configuring a, or by a, wireless device may comprise setting one or more parameters and/or registers of the wireless device and/or tune and/or set one or more components or subsystems and/or circuitry, e.g. a control circuitry and/or radio circuitry, in particular to bring the wireless device into a desired operation mode, e.g. for transmitting and/or receiving data according to allocated resources and/or as scheduled by a network node and/or to be configured for communication via or with one or more cells of a cellular network and/or one or more than one ProSe enabled devices. A wireless device may be adapted for configuring itself, e.g. based on configuration and/or allocation data, which it may receive from a network or network node.

Each or any one of the wireless devices or user equipments described or shown may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the network nodes or controlling nodes or eNBs or base stations described or shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

There is generally discussed a method for operating a wireless device, the wireless device being D2D enabled, wherein the method comprises: determining feedback on one or more than one channels or links of D2D operation; sending different feedback on different channels and/or to different targets. Also, related devices and methods are discussed herein.

The invention claimed is:

1. A method for operating a wireless device, the wireless device being Device-to-Device (D2D) enabled, the method comprising:
   determining, by a feedback determining module, a feedback on one or more than one communication channel comprising at least one channel of D2D communication, wherein the feedback comprises information to be transmitted to one or more user equipments, one or more network nodes, and one or more base stations;
   sending, by a sending module, one or more reports on the feedback to different targets, wherein the one or more reports comprise information pertaining to one or more communication channels on which feedback has been determined; and
   receiving, by a receiving module, a configuration data and an allocation data, wherein one of the configuration data or the allocation data indicates a transmission mode and a report mode, based on which the feedback and sending of the one or more reports on the feedback are determined.

2. A wireless device for a wireless communication network, the wireless device being Device-to-Device (D2D) enabled, the wireless device configured to perform operations comprising:
   determining, by a feedback determining module, a feedback on one or more than one communication channels comprising at least one channel of D2D communication, wherein the feedback comprises information to be transmitted to one or more user equipments, one or more network nodes, and one or more base stations;
   sending, by a sending module, one or more reports on the feedback to different targets, wherein the reports comprise information pertaining to the feedback on one or more than one communication channels; and receiving, by a receiving module, a configuration data and an allocation data, wherein one of the configuration data or the allocation data may indicate a transmission mode and a report mode, based on which the feedback and one or more reports on the feedback are determined.

3. A method for operating a network node in a wireless communication network, the method comprising :

configuring, by a configuring module of the network node, a Device-to-Device (D2D) enabled wireless device for sending different reports on feedback on one or more than one communication channel comprising at least one channel of D2D communication to different targets, wherein the feedback comprises information to be transmitted to one or more user equipments, one or more network nodes, and one or more base stations, wherein the reports comprises information pertaining to the feedback on one or more than one communication channel; and configuring, by a configuring module, a configuration data and an allocation data, wherein one of the configuration data or the allocation data indicates a transmission mode and a report mode, based on which the feedback and sending of the one or more reports on the feedback are determined.

4. A network node for a wireless communication network, the network node configured to perform operations comprising:

configuring, by a configuring module of the network node, a Device-to-Device (D2D) enabled wireless device for sending different reports on feedback on one or more than one communication channel comprising at least one channel of D2D communication to different targets, wherein the feedback comprises information to be transmitted to one or more user equipments, one or more network nodes, and one or more base stations, wherein the reports comprises information pertaining to the feedback on one or more than one communication channel; and configuring, by the configuring module, a configuration data and an allocation data, wherein one of the configuration data or the allocation data may indicate a transmission mode and a report mode, based on which the feedback and sending of the one or more reports on the feedback are determined.

* * * * *